United States Patent
Mellentine et al.

(10) Patent No.: US 6,872,337 B2
(45) Date of Patent: Mar. 29, 2005

(54) EXTERNAL MIX SPRAY URETHANE PROCESS AND NOZZLE USED THEREFOR

(75) Inventors: Andrew P. Mellentine, Owosso, MI (US); Glenn D. Williams, Holly, MI (US); Joseph T. Donatti, Howell, MI (US); John E. Nemazi, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 223 days.

(21) Appl. No.: 10/295,111

(22) Filed: Nov. 15, 2002

(65) Prior Publication Data

US 2004/0094865 A1 May 20, 2004

(51) Int. Cl.$^7$ ............... B29C 67/00; B28B 5/00; B28B 7/22; B28B 1/32
(52) U.S. Cl. ............ 264/46.4; 264/45.1; 264/250; 264/255; 264/259; 264/309
(58) Field of Search .............. 264/46.4, 259, 264/309, 45.1, 250, 255

(56) References Cited

U.S. PATENT DOCUMENTS

| | | |
|---|---|---|
| 4,770,827 A | 9/1988 | Fischer |
| 4,809,909 A | 3/1989 | Kukesh |
| 5,141,156 A | 8/1992 | Hoy et al. |
| 5,171,613 A | 12/1992 | Bok et al. |
| 6,136,379 A | 10/2000 | Scarpa et al. |
| 6,352,658 B1 * | 3/2002 | Chang et al. .............. 264/46.4 |
| 2002/0130200 A1 | 9/2002 | Hurray et al. |

FOREIGN PATENT DOCUMENTS

| | | |
|---|---|---|
| DE | 7124435 | 6/1971 |
| DE | 2240698 | 2/1974 |
| DE | 2708745 | 9/1977 |
| DE | 4042310 | 3/1992 |

* cited by examiner

*Primary Examiner*—Stephen J. Lechert, Jr.
(74) *Attorney, Agent, or Firm*—Bill C. Panagos

(57) ABSTRACT

A method of forming a polyurethane article wherein first and second components of a polyurethane system are sprayed into an unconfined space above a mold. The first and second components are sprayed together to mix initially in the space above the mold and then are deposited in the mold on an in-mold coating that was previously applied to the mold. The two components of the polyurethane system and in-mold coating are subsequently removed from the mold as a flexible polyurethane skin. The skin may then be placed in a second mold along with a reinforcement. Structural polyurethane foam may then be injected to the second mold where it bonds to the reinforcement and the skin to form a finished polyurethane article having a flexible skin adhered to its surface. A post-mix spray nozzle assembly is provided with a central nozzle forming a first hollow conical spray pattern and a coaxially aligned annular nozzle forming a second hollow conical spray pattern. The first and second hollow conical spray patterns intersect in space remote from the nozzle and form a hollow circular spray pattern.

5 Claims, 5 Drawing Sheets

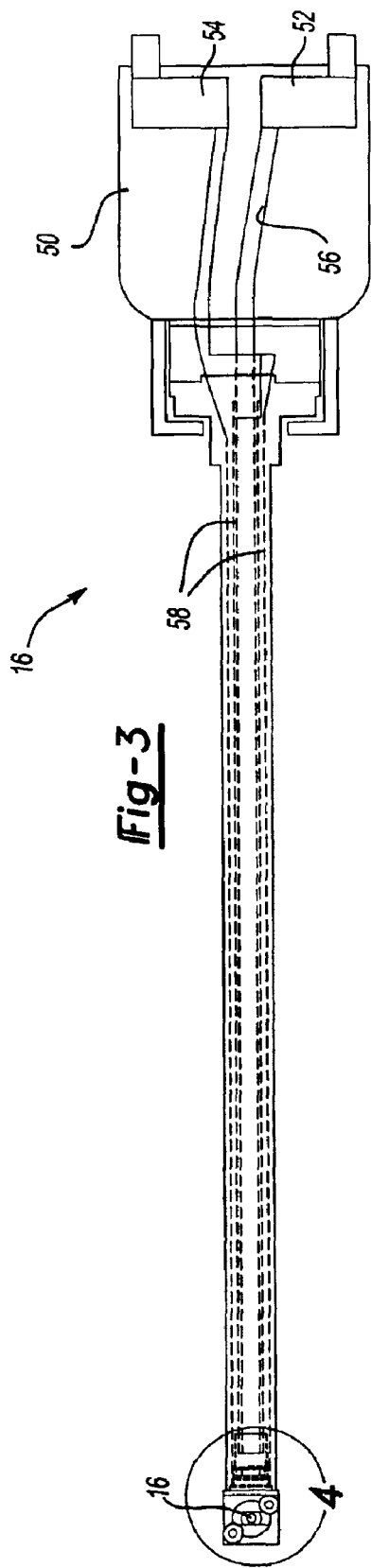
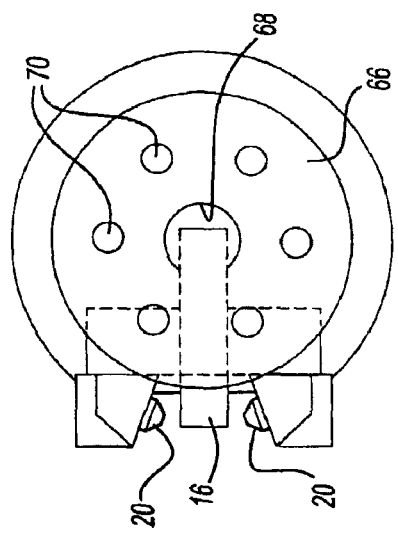
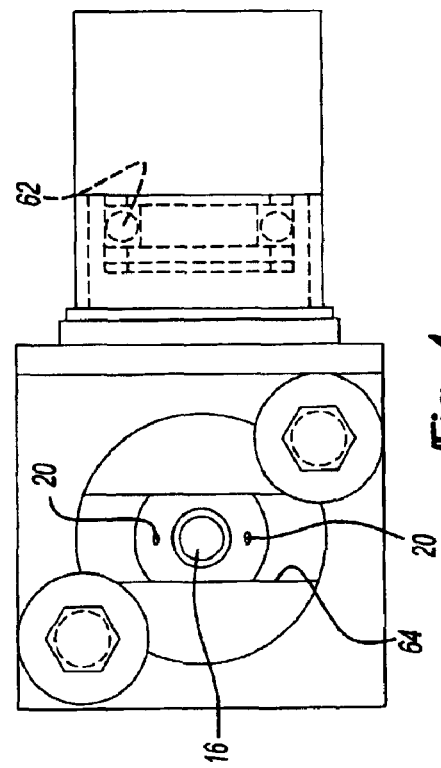

EXTERNAL MIX SPRAY URETHANE PROCESS AND NOZZLE USED THEREFOR

BACKGROUND OF THE INVENTION

1. Field of the Invention

This invention relates to forming polyurethane articles in a spray forming process.

2. Background Art

Over time, polyurethane materials have been developed and implemented in processes used in manufacturing articles. For example, in the manufacture of automotive interior components, it has been proposed to form such components by spraying a gellified polyurethane material into a mold to form a skin that is later placed in a polyurethane foam forming mold and filled with structural polyurethane foam to form at least part of a finished part. One such gellified polyurethane foam skin, as proposed in U.S. Pat. No. 5,071,683, is formed by combining a mixture of polyurethane reactants that is mixed under pressure in a spray gun and then sprayed as a mixture by a single nozzle in the form of a film and/or drops.

In the '683 patent, a mixing chamber in the spray gun has an input for polyol and isocyanate components in which the polyol and the isocyanate are mixed in the mixing chamber with a high speed counter-current that is then dispensed through a nozzle. The nozzle is designed to form a truncated cone shaped spray that breaks apart into droplets prior to being deposited on a surface. This approach to form a gellified polyurethane skin suffers from the disadvantage of requiring frequent purging of the mix gun. Purging the reactants wastes expensive polymer materials. The system also requires solvent flushing because the polyol and the isocyanate mix within the mix head or nozzle causing the system to become clogged or blocked.

With an internal mixing system, the polyol and the isocyanate reactants are mixed at high pressure requiring the system to be designed to withstand high pressures to provide a good internal mix of the polyol and isocyanate. This design can result in nozzles being partially or completely plugged. In addition, high pressure operation results in increased wear and tear on the spray line equipment. High pressure pumps required for an internal mixing system are considerably more costly than systolic, diaphragm, or gear pumps that may be used in lower pressure systems. Spray tips based on this concept is limited in amount of output that can be delivered and, therefore, may lead to increased cycle times.

In summary, prior art internal mix systems are more costly due to raw material waste, waste of solvents for cleaning spray equipment, and increased machinery costs due to high pressure system components. Prior art internal mixing systems also require longer cycle times due to the time required to purge material from the system and flush the system with solvent.

These and other problems are addressed by applicant's invention as summarized below.

SUMMARY OF THE INVENTION

According to one aspect of the present invention, a method of forming a polyurethane skin is provided. The method includes dispensing a first composition used to form a polyurethane skin into an open area, and dispensing a second composition used to form the polyurethane skin into the open area so that it contacts the first composition. The first and second compositions react to form a polyurethane composition that, when cured, is incorporated into the polyurethane article made according to the method.

According to other aspects of the invention, the steps of dispensing the first and second composition are performed by spraying the first and second compositions through separate nozzles. The nozzle may spray in a substantially fan-shaped pattern or, alternatively, may be sprayed with one of the compositions being sprayed in one spray pattern and the second composition being sprayed in a second spray pattern that intersects with the first spray pattern. The spray pattern may be two fan shaped spray patterns or two hollow conical spray patterns that mix external to the spray head and intersect above the mold. The first and second compositions may be an isocyanate or a polyol. The first and second compositions may be sprayed together prior to being deposited on a mold. The method may also include applying an in-mold coating prior to dispensing the components. The in-mold coating may be a pigmented ultraviolet light resistant coating. A mold release compound may be applied to the mold before the step of applying the in-mold coating.

According to another aspect of the invention, a method for forming an article is provided that comprises applying a mold release agent in a mold, applying an in-mold coating onto the mold and then spraying first and second components of a polyurethane system into the space above the mold. The first and second components are sprayed from separate nozzles so that the first and second components mix initially in the space above the mold and are then deposited in the mold and onto the in-mold coating.

According to another aspect of the invention, the method of forming an article may also comprise allowing the first and second components to react with one another to form a polyurethane skin that is bonded to the in-mold coating. The skin is then removed from the mold and inserted into a second mold. A polyurethane foam is then injected into the second mold and onto the skin. The polyurethane foam is permitted to cure in the second mold and bond to the skin prior to being removed from the second mold. The method of forming an article may also include the further step of inserting a reinforcement into the second mold before injecting the polyurethane foam. The polyurethane foam is allowed to cure and bonds to the reinforcement and the skin.

According to another aspect of the invention a post-mix spray nozzle assembly is provided for forming intersecting coaxial hollow conical spray patterns that can be used to form a polyurethane skin. The spray nozzle includes a central nozzle connected to a first liquid source forming a hollow conical spray pattern. An annular nozzle is coaxially oriented with the central nozzle forming a second hollow conical spray pattern of a second liquid. The two hollow conical spray patterns intersect in space remote from the nozzles forming a hollow generally conical spray pattern.

These and other aspects of the present invention will be better understood in view of the attached drawings and the following detailed description of a preferred embodiment of the invention.

BRIEF DESCRIPTION OF THE DRAWINGS

FIG. 3 is a bottom plan view of one embodiment of a spray gun that may be used to form a polyurethane article according to the present invention;

FIG. 4 is an enlarged view of the nozzle and spray tip portion of the gun shown in FIG. 3;

FIG. 5 is an end view of a spray tip made according to the present invention;

DETAILED DESCRIPTION OF THE PREFERRED EMBODIMENTS

Figure 1:
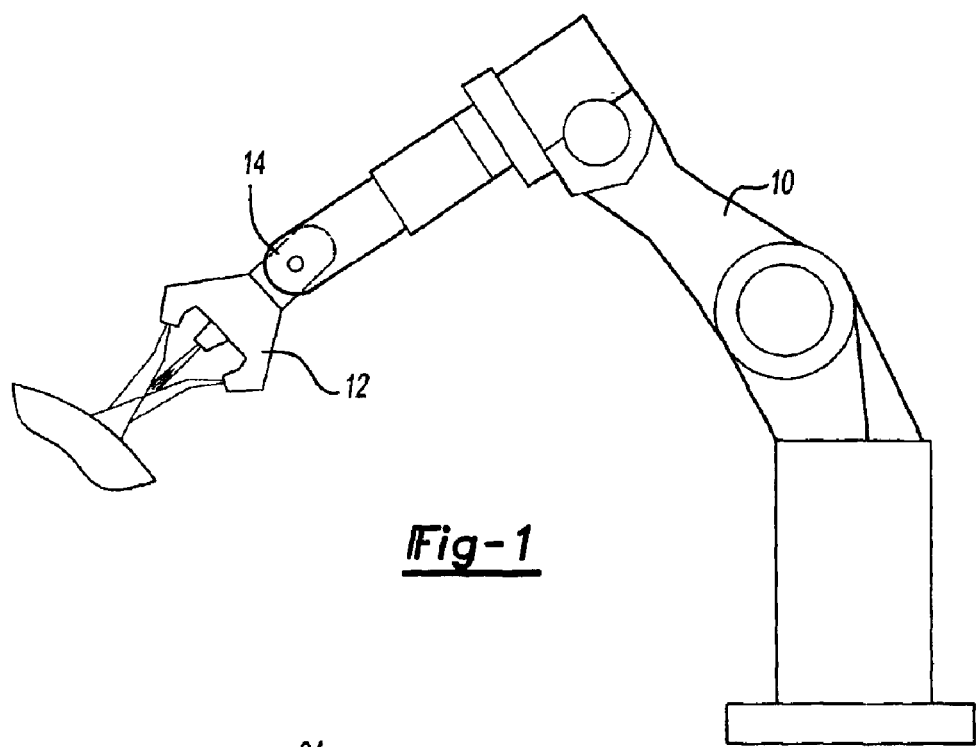
FIG. 1 is a side elevation view of a robot having a nozzle for externally mixing compositions used to form a polyurethane article according to the present invention.

Referring now to FIG. 1, a robot arm 10 having a spray head 12 on its distal end 14 is shown. While the preferred embodiment has been developed in the context of a robotic system, other systems could be used including a manual spray or non-robotic automated spray system. The spray gun 12 may take many forms but as depicted is a metal wand having passageways for directing fluid to a central nozzle 16.

Figure 2:
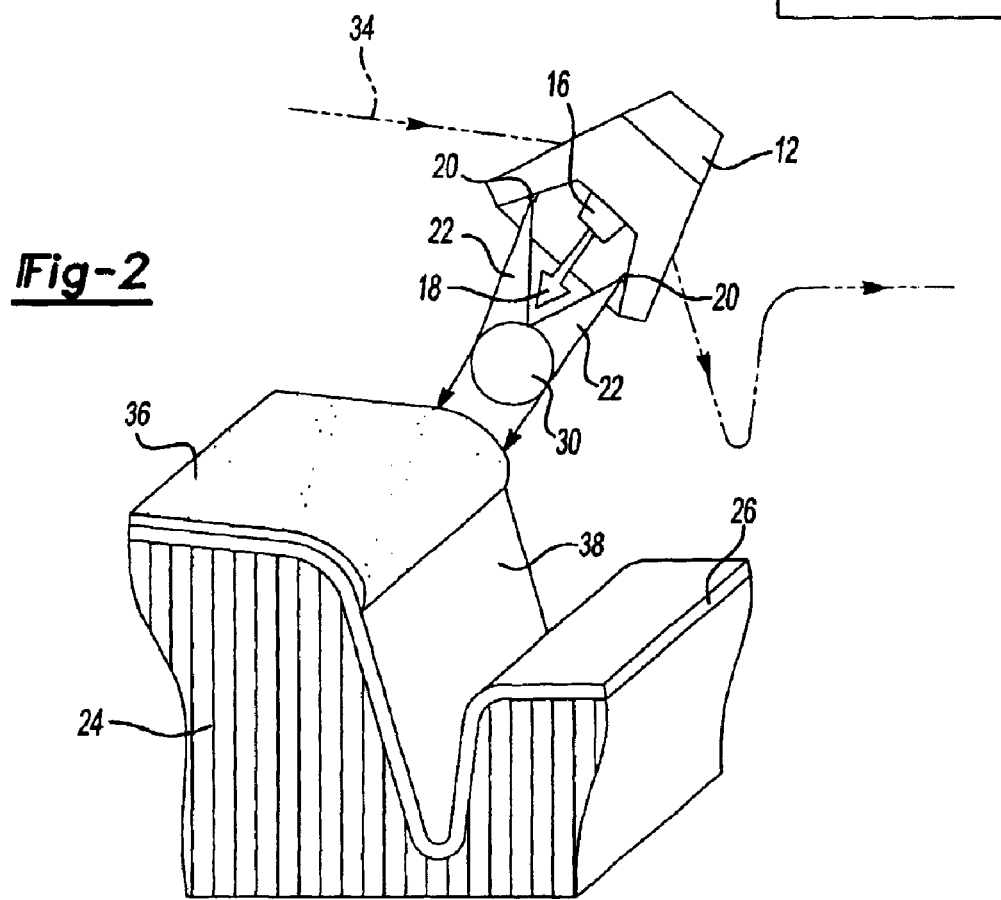
FIG. 2 is a perspective view of the nozzle and a mold used to form a polyurethane article in the mold according to the present invention.

In the embodiment shown in FIGS. 1 and 2, the multi-nozzle tip spray gun 12 is shown to include a central nozzle 16 that is used to spray a first component 18. A pair of inwardly directed outboard nozzles 20 spray second component 22 in a converging pattern directed toward the first component 18. The first and second component sprays 18 and 22 combine to form a polyurethane mixture that is then deposited and cured on a mold 24 having a mold surface 26 on which the first and second component sprays 18 and 22 are applied. In certain embodiments, the first component is isocyanate and the second component is a polyol.

The components are preferably sprayed at pressures of about 100 to 2,000 psi, more preferably about 500 to about 1,000 psi, and most preferably about 500 to 700 psi. In certain embodiments, the components contact each other preferably at about 0.5 to about 0.15 meters above the mold 24 and most preferably about 0.100 meters above the mold 24.

In the embodiment shown in FIG. 4, the spray gun 12 is shown dispensing the first component spray 18 zero degrees from the central nozzle 16 and two separate spray patterns of the second component spray 22 are sprayed by the two inwardly directed outboard nozzles 20 at an angle of between 20 to 60° and preferably between 28 to 35°. The first and second component sprays 18 and 22 combine in a mixing area 30 that is external to the spray gun 12. After passing through the mixing area 30 approximately 0.006 and 0.013 meters from center spray orifice, the first and second component sprays 18 and 22 are deposited on the mold surface 26.

The spray gun 12 is moved through a path of movement illustrated by phantom line 34 in FIG. 2 and also translates across the mold surface so that a polyurethane skin 36 having an approximate thickness 0.80 to 1.20 mm, preferably 1.00 mm is formed by mixing first and second component sprays 18 and 22. The mold surface 26 is preferably first coated with a pigmented in-mold UV resistant coating 38 that has an approximate thickness of 0.80 to 1.2 mils, preferably 1.0 mil to provide a polyurethane skin having a desired color on its external surface. The external surface is formed by the in-mold coating 38 that is first applied to the mold surface 26. A mold release agent is preferably applied to the mold surface 26 prior to application of the in-mold coating 38 but is not visible in the drawing because it is a thin coating applied only to facilitate removal of the polyurethane skin 36 and in-mold coating 38.

The polyurethane skin 36 is later inserted in a polyurethane foam forming mold along with a reinforcement (not shown). Structural foam, is then injected into the foam forming mold. The structural foam may be a polyurethane based foam. The foam bonds to the skin 36 and reinforcement to form a finished polyurethane article having a flexible skin adhered to its surface.

Referring now to FIGS. 4 and 5, the spray gun 12 is shown in greater detail. The spray gun 12 includes a valve body 50 for housing an isocyanate valve 52 and a polyol valve 54. The isocyanate valve 52 provides isocyanate to a central tube 56 that extends the length of the spray gun 12. The polyol valve 54 provides a polyol composition to at least one peripheral tube 58 disposed around tube 56. The peripheral tube 58 extends the length of the spray gun 12. It should be understood that more than one tube could be provided and that the polyol and isocyanate components could be supplied by the opposite tubes. The central tube 56 may be sealed from the polyol by means of an O-ring 62. The multi-nozzle tip spray gun 12 includes a central nozzle 16 and outboard nozzles 20. The outboard nozzles 20 also preferably sprayed in a fan shaped pattern or other pattern that facilitates mixing of the isocyanate and polyol externally relative to the spray gun 12.

Figure 6:
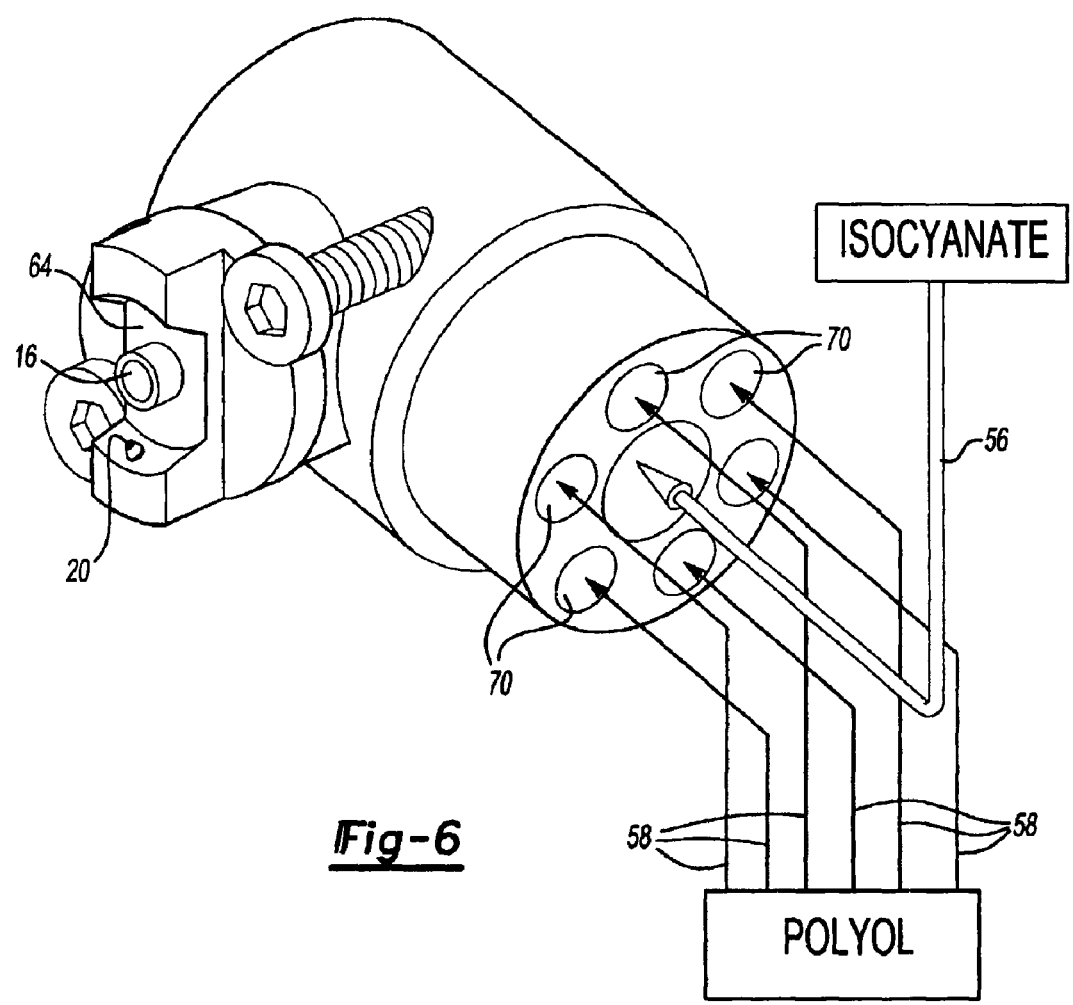
FIG. 6 is a fragmentary perspective view of a spray tip made according to the present invention.

Referring now to FIG. 6, the multi-nozzle tip spray gun 12 is shown to include a manifold plate 66 having a central hole 68 in which the central tube 56 is inserted that supplies the isocyanate, or component one, to the control nozzle 16. Peripheral holes 70 direct polyol, or component 22, to outboard nozzles 20. Central nozzle 16 is disposed at a right angle relative to the length of the central tube 56. The central nozzle 16, as illustrated, protrudes from the multi-nozzle spray gun 12 but could also be flush with or recessed relative thereto. Polyol is directed through the peripheral tube 58 to the multi-nozzle tip 16 where it is directed through the two outboard nozzles 20.

Figure 7:
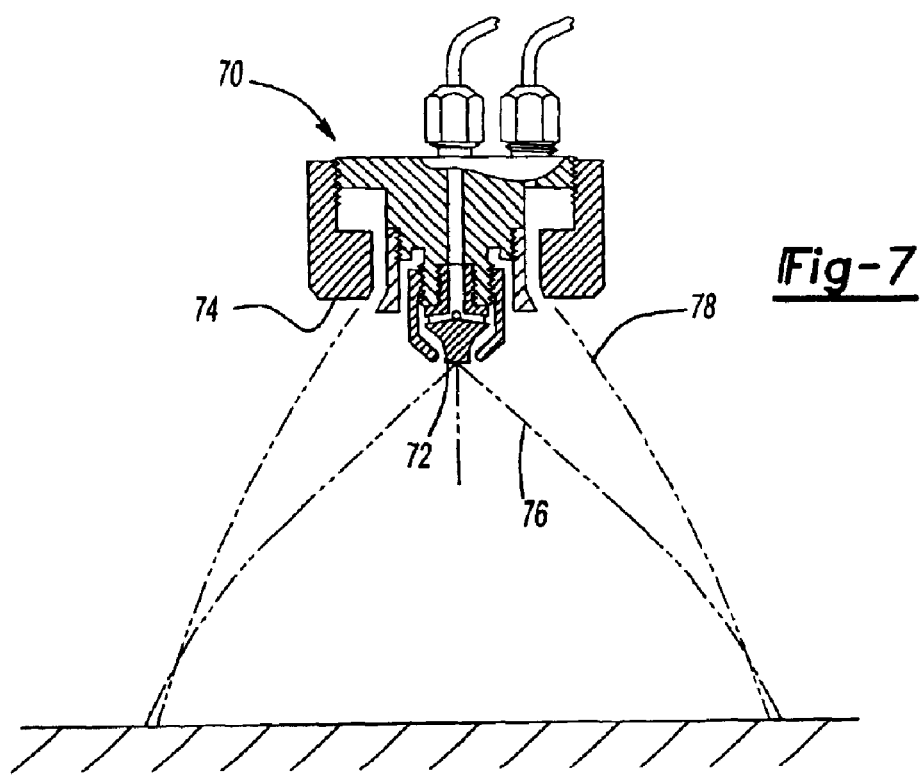
FIG. 7 is a side elevation view of an alternative external mixing nozzle used to form a polyurethane coating.
Figure 8:
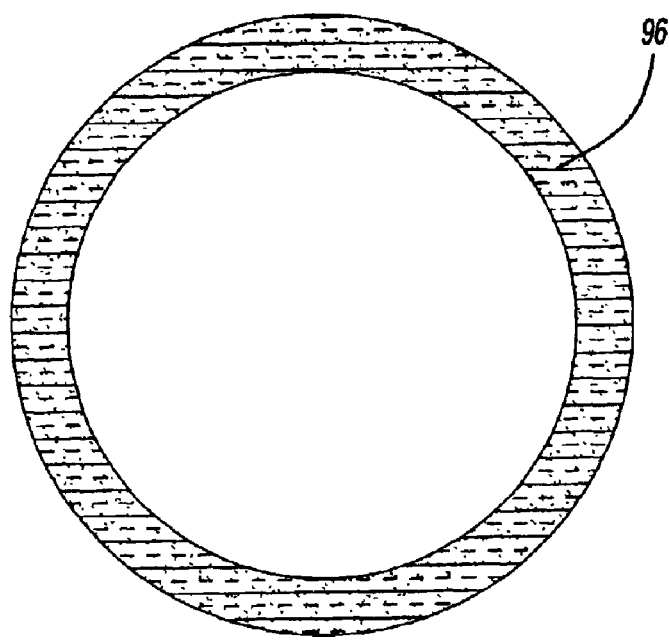
FIG. 8 is a spray pattern formed by the mixing nozzle of FIG. 7.
Figure 9:
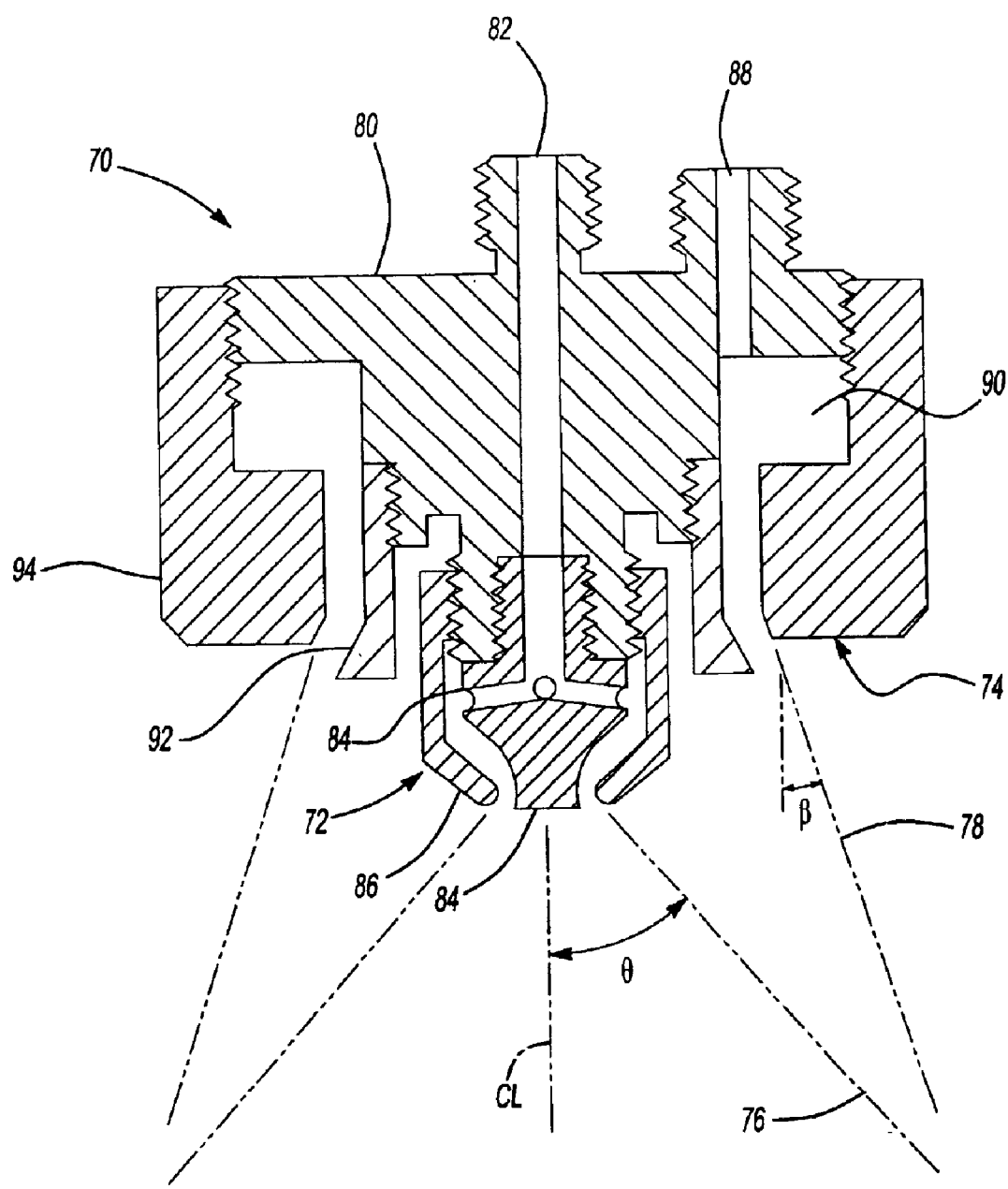
FIG. 9 is an enlarged cross-sectional view of the mixing nozzle of FIG. 7.

Referring now to FIGS. 7–9, an alternative external mixing nozzle 70 is illustrated. Mixing nozzle 70 simultaneously sprays two liquid components which mix in air after exiting the nozzle. The nozzle assembly 70 has a central nozzle 72 for spraying a first mixing component and a generally circum axial annular second nozzle 74 for spraying a second mixing component. In the case of making a polyurethane article, one of the nozzles 72 and 74 sprays isocyanate and the other sprays polyol. Central nozzle 72 forms a generally frustoconical spray pattern 76 that is generally hollow with the spray liquid concentrated in the surface of the frustoconical shape. Annular orifice 74 forms a generally coaxially aligned frustoconical spray pattern 78. The cone angle of the inner cone 74 is greater then the cone angle of the outer cone 78 causing the two spray patterns to intersect in mid air after leaving the respective central and annular orifices 72 and 74. The resulting spray pattern as received on the article to be coated forms a generally hollow ring, as illustrated in FIG. 8.

A cross-sectional view of a representative mixing nozzle 70 is illustrated in FIG. 9. Mixing nozzle 70 has a nozzle body 80 having two internal passages, one for each of the two liquids to be mixed. The first internal passage 82 supplies central orifice 72. Central orifice 72 is formed by pintel 84 and orifice 86 which are attached to nozzle body 80 in a conventional manner. The frustoconical spray pattern 76, which is formed by the central orifice 72, deviates from the nozzle center line by an angle θ as is illustrated. Nozzle body 80 additionally has a second internal passage 88 that opens into annular reservoir 90 within the nozzle assembly. Annular reservoir 90 communicates with the annular orifice 74 which is coaxially aligned with the central orifice 72 and spray axis CL. Annular orifice 74 is formed by a pair of removable ring elements 92 and 94 which can be axially adjusted relative to one another in order to vary the orifice area and resulting spray pattern. Annular orifice 74 forms a frustoconical spray pattern 78 which deviates from the common center line CL by an angle β which less then angle θ. Accordingly, the two spray patterns 76 and 78 intersect in space causing the spray components to at least partially mix external to the nozzle before being deposited on the surface to be coated.

The mixing nozzle 70 is capable of forming a hollow circular spray pattern 96 that is made of both finely mixed particles of the two liquid components sprayed. Making both the spray orifices coaxial has a further benefit of eliminating the registration problems resulting when two fan shaped paths are mixed in mid air. If the fan shaped spray patterns are not the same width at the point of intersection or if they are shifted slightly relative to one another, a zone may exist where the mixing ratio for the two components deviates from the desired. By forming the fan pattern into an endless loop spray, registration problems can be minimized. Of course with this nozzle embodiment as with all spray nozzles spraying two components, it is important that spraying of the two liquids be initiated and terminated simultaneously to avoid mixing ratio variations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming an article, comprising:

applying a mold release agent onto a mold;

applying an in-mold coating onto the mold;

spraying a first component of a polyurethane system into the space above the mold; and spraying a second component of the polyurethane system into the space above the mold separately from the first component while the first component thereof is sprayed so that the first and second components mix initially in the space above the mold and are then deposited in the mold onto the in-mold coating.

2. The method of forming an article of claim 1 wherein the first component is a isocyanate and the second component is a polyol.

3. The method of forming an article of claim 1 wherein the steps of spraying the first and second components are performed by spraying through separate nozzles that each produce a fan spray.

4. The method of forming an article of claim 1 wherein the steps of spraying the first and second components are performed by spraying through a first and a second separate nozzles wherein the first nozzle sprays in a substantially conical pattern and the second nozzle sprays in a substantially cylindrical spray pattern that intersects the substantially conical spray pattern of the first nozzle.

5. The method of claim 4 wherein the first composition is an isocyanate composition and the second composition is a polyol.

* * * * *